Figure 1:
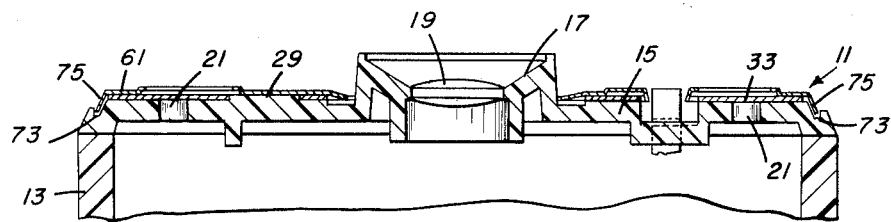

Sept. 14, 1965   D. M. PETERSON   3,205,800
COVER PLATE ASSEMBLY
Filed Feb. 18, 1963

DEAN M. PETERSON
INVENTOR.

BY

ATTORNEYS

United States Patent Office 3,205,800
Patented Sept. 14, 1965

3,205,800
COVER PLATE ASSEMBLY
Dean M. Peterson, Rochester, N.Y., assignor to Eastman Kodak Company, Rochester, N.Y., a corporation of New Jersey
Filed Feb. 18, 1963, Ser. No. 258,994
7 Claims. (Cl. 95—11)

The present invention relates to a photographic apparatus and, more particularly, to a decorative cover plate assembly for the front of a camera.

It is common practice in the manufacture of photographic cameras to print or etch metal cover plates which are individually blanked and formed to be mounted on the front of the cameras. The metal cover plates serve the functions of covering some of the camera operating mechanism, lending strength and rigidity to the front wall of the camera, and presenting an attractive appearance. During the blanking and forming of the cover plates great care must be exercised to prevent scratching of the surface of the plates and this special handling further contributes to the relatively high unit cost of the etched plates. Usually the printed matter on the plates is both instructional, i.e., relates to the operation of the camera, and also serves to identify the manufacturer and the product model. When it is desired to distribute the camera in foreign countries, it is frequently necessary to prepare plates printed in a different language or at least in a different format in order to better conform to the local customs. Also, of course, if it is desired merely to modify the information carried on the cover plates, it is necessary to discard the unused plates and to prepare new cover plates. These considerations also contribute to a high per-unit cost of the etched metal cover plates and the natural result is that such cover plates can be utilized on only the more expensive cameras.

The disadvantages of high per-unit cost and complexity of manufacture are completely avoided with the novel cover plate assembly of the present invention. The cover plate assembly comprises a flat sheet member on which the desired indicia, such as trademarks and/or instructions, is provided, and a decoratively formed cover plate which is mounted over the sheet and has openings which are aligned with the indicia so that the same may be viewed through the cover plate. According to another aspect of the present invention, the sheet member and the cover plate are formed with openings in alignment with certain camera operating parts, such as, for example, the lever which adjusts the diaphragm opening, so that such parts can be operated through the cover plate assembly from the front of the camera in the usual manner. Still another aspect of the present invention comprises means for aligning the sheet member on the camera front wall so that the openings and indicia are properly oriented with respect to the front wall. Yet another aspect of the present invention comprises a coating of a clear transparent material over the indicia on the sheet member so that such indicia, though visible, is protected from scratches during use of the camera.

One object of the present invention is, therefore, to provide an improved cover plate assembly for a photographic apparatus.

Another object of the present invention is to provide for a photographic camera, a protective cover plate assembly in which visible indicia thereon can be inexpensively prepared and interchangeably used as required.

Another object of the present invention is to provide for a photographic camera a decorative cover plate assembly which is simple to use and inexpensive to manufacture.

Figure 2:
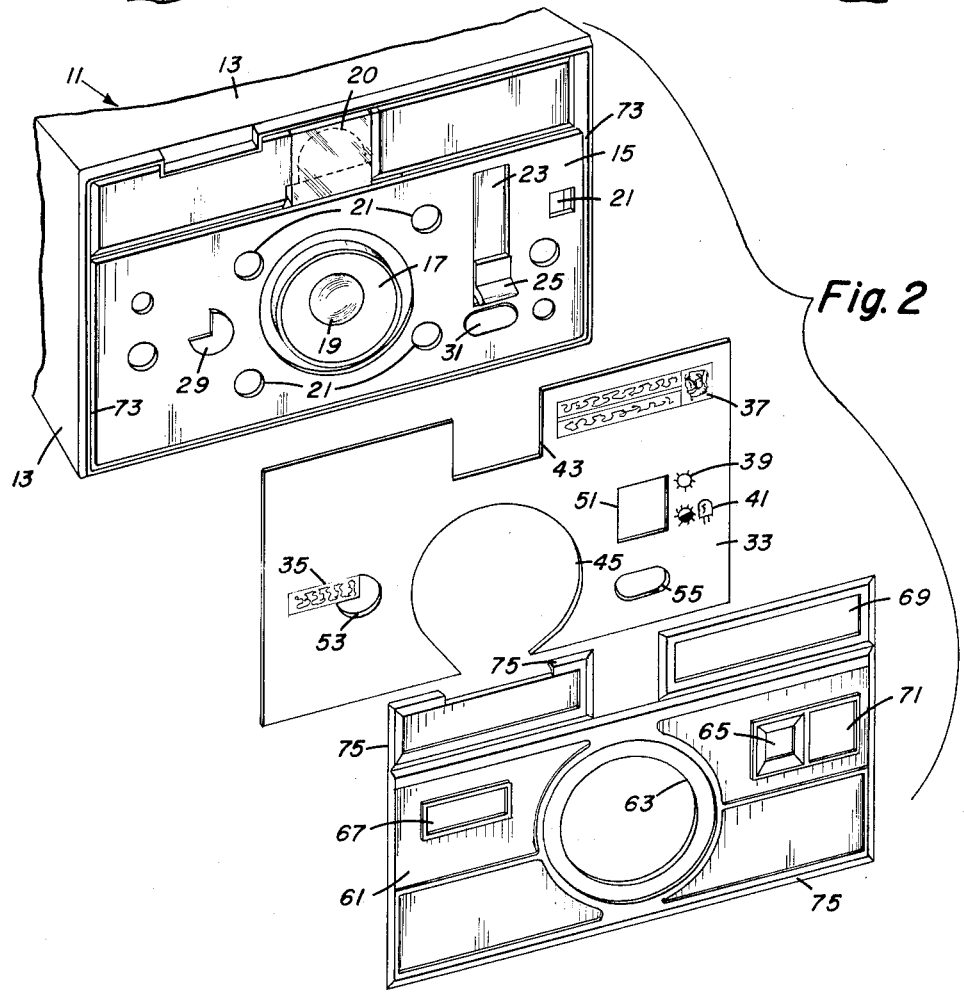

Still other objects and advantages of the present invention will become readily apparent to those skilled in the art from the following description with reference to the drawings in which like characters denote like parts and wherein:

FIG. 1 is a section view showing the cover plate assembly of the present invention mounted on the front wall of a camera; and FIG. 2 is an exploded perspective view further showing the cover plate assembly of the present invention.

In the drawing the numeral 11 designates a photographic camera having side walls 13 and a front wall 15. The front wall 15 includes an integrally formed lens mount 17 which retains a lens 19, an aperture for receiving the viewfinder lens 20, and a number of holes 21 formed in various locations through the front wall 15. The holes 21 are utilized for mounting and/or receiving various internal parts (not shown) of the camera. On one side of the front wall 15, a vertically disposed slot 23 is formed. Slot 23 receives a lever 25 which extends forwardly of the front wall and which is operatively associated with the diaphragm (not shown) of the camera. The diaphragm opening of the camera is selected by manually positioning the lever 25 in one of its spaced operating positions. The numerals 29 and 31 designate locating elements which are raised slightly from the front surface of front wall 15.

The thin sheet member 33, which is preferably formed of paper, is imprinted or otherwise marked with indicia. The indicia may comprise a trademark 35 which identifies the manufacturer of the camera, a product or model designation 37 and informational words and illustrations 39 and 41 which for the illustrated camera identify the positions of the lever 25. Indicia 39 as shown is a representation of a bright sun and indicia 41 is a representation of a bright sun covered by a cloud and a representation of a flash lamp. These representations are intended to indicate to the operator of the camera that the diaphragm lever 25 should be set opposite the representation corresponding to the conditions prevailing at the time. It is to be understood that the printed indicia 35, 37, 39, and 41 can be varied in content as required for any given product. The position of the printed indicia on the sheet member 33 is governed somewhat by common practice and by the structure of the camera front wall on which it is to be mounted, but the position can be varied as desired within the concept of the present invention.

Sheet number 33 is cutout at 43 to accommodate the viewfinder 20 and at 45 to receive lens mount 17. The numeral 51 designates an opening formed in sheet member 33 which is of sufficient size to permit diaphragm lever 25 to extend therethrough so that the lever may be operated externally of the camera. Sheet member 33 is also formed to define two apertures 53 and 55, which correspond, respectively, in size and configuration to locating elements 29 and 31 so that when the apertures are engaged over the locating elements the sheet member 33 is properly aligned on the front wall 15 of the camera. The side of sheet member 33 which is to be mounted on front wall 15 is coated with an adhesive, preferably a pressure-sensitive adhesive, for securing the sheet member to the surface of the front wall.

The numeral 61 designates the front cover plate of the novel cover plate assembly. The cover plate 61 is preferably formed of a thin-gauge metal so as to add structural rigidity to the camera, and to protect the thin sheet member 33 and internal operating mechanism of the camera from damage. While aluminum is preferred for the cover plate, plastic or other available materials could be used in some instances to equal advantage. Opening 63 is formed in cover plate 61 to permit lens mount 17 to extend therethrough. Similarly, opening 65 is disposed to permit operating lever 25 to extend through the cover plate 61 so that it can be manually operated from the front of the camera. Apertures 67, 69 and 71 are provided in the cover plate 61 so that the indicia 35, 37, 39 and 41 on sheet member 33 are exposed to view when the cover plate is properly oriented over the sheet 33 and mounted on the camera 11. It will be apparent that the opening 63 and opening 65 assist in locating the cover plate 61 on the front wall 15 of the camera through engagement with lens mount 17 and operating lever 25, respectively. Cover plate 61 can be attached to the front wall 15 of the camera in any suitable manner such as by rivets or bent-over tabs, but it has been found very satisfactory and expedient to use several spots of glue strategically disposed on the cover plate to secure the same on sheet member 33.

In using the invention, one prints and die-cuts to proper size and shape a number of the sheet members 33. These sheet members are preferably formed of paper because of ease of handling and cost considerations, but of course, any other suitable material such as cardboard, fiberboard or plastic can also be utilized. Frequently, it is desirable to coat the sheet member 33, particularly in the areas containing indicia, with a transparent material to protect the indicia from being scratched or defaced during use of the camera. The transparent material is preferably a hydrophobic transparent film formed of any suitable compound, such as, for example, polyethylene terephthalate, styrene-butadiene copolymer, a vinylidene chloride polymer, or a vinyl chloride polymer. The sheet member 33 can be die-cut from sheets which are already coated with a pressure-sensitive adhesive on one side so that a separate adhesive-applying operation is not required. It then is a simple matter to remove the protective backing member, if any, from the adhesive coated side of the sheet member 33 and position the sheet member by means of elements 29 and 31 on the surface of front wall 15 of the camera.

A suitable adhesive is applied to the back of cover plate 61 and cover plate 61 is pressed down over sheet member 33 with apertures 65, 67, 69, and 71 in alignment with the indicia on member 33. When so located, the indicia can be viewed through the cover plate; the lever 25 and lens mount 17 extends through the cover plate; and the internal mechanism of the camera is protected from accidental damage during use of the camera. It is to be noted that in the event a rigid cover plate such as that disclosed is not mounted over the sheet member 33, the sheet member will deform, upon handling the camera, in the areas of the holes 21 and slot 31 thereby presenting an undesirable appearance.

While not a necessary element of the present invention, it is usually desirable to emboss the cover plate 61 to form an interesting and decorative front surface thereon. The embossing can be carried out at the same time that the cover plate is die-cut from the metal sheet. As shown in FIG. 1, the camera 11 has formed in its front wall 15 a shallow groove 73 extending around the periphery of the front wall. It is preferred to form downwardly the peripheral edge 75 of cover plate 61 so that the edge 75 extends down into groove 73 when mounted on the camera and no sharp metal edges are exposed to possibly injure the user of the camera.

From the foregoing description it is apparent that the indicia on the sheet member 33 can be replaced easily and inexpensively by simply preparing a new inexpensive paper sheet without requiring any change in the metal cover plate 61. Thus a variety of front cover plate assemblies for photographic cameras can be provided at very low cost.

It will now be appreciated by those skilled in the art that the cover plate assembly of the present invention permits convient interchangeability of cover plate indicia, provides a decorative front affording a variety of design possibilities, and is easy to use and inexpensive to manufacture. While the cover plate assembly has been described in conjunction with a photographic camera, it is realized that the same novel techniques and concepts of the invention could be utilized with equal advantages on other photographic or reproducing apparatus such as, for example, projectors, motion picture cameras, viewers, microfilmers, readers, copiers, sound equipment, etc.

The invention has been described in detail with particular reference to preferred embodiments thereof, but it will be understood that variations and modifications can be effected within the spirit and scope of the invention as described hereinabove and as defined in the appended claims.

Having now particularly described my invention, what I desire to secure by Letters Patent of the United States and what I claim is:

1. A cover plate assembly for a photographic apparatus having a surface provided with at least one raised locating element and formed with at least one opening therein, said assembly comprising:
   (a) a deformable indicia bearing cover sheet mounted on said surface and covering said opening;
   (b) said sheet including an aperture defining means for cooperating with said element to orient said sheet in a predetermined relation on said surface; and
   (c) a plate member mounted over and substantially covering said sheet and including means for orienting the member in a predetermined relation to said surface;
   (d) said plate member:
      (1) having an aperture formed therein which is aligned with said indicia when the plate member is oriented in said predetermined relation to thereby render said indicia visible through the plate member, and
      (2) being formed of a substantially rigid material for protecting said sheet against deformation into said opening in said surface.

2. A cover plate assembly in accordance with claim 1 wherein the indicia on said sheet is coated with a transparent protective material.

3. A cover plate assembly in accordance with claim 2 and wherein said sheet has an adhesive on the side thereof opposite said indicia for mounting the sheet on said surface.

4. A cover plate assembly in accordance with claim 3 and wherein said plate member comprises an embossed metal sheet having a raised surface adjacent to said aperture and about the plate member periphery to frame the aperture and to form a decorative surface on said apparatus.

5. A cover plate assembly for mounting on an external surface of a photographic apparatus, said surface having a groove formed in the periphery thereof, at least one raised locating element and at least one opening in said surface, said assembly comprising:
   (a) a deformable indicia bearing sheet member, having an adhesive on the side thereof opposite the side bearing indicia;
   (b) said sheet being mounted on said surface and defining means for cooperating with said element to orient said sheet in a predetermined relation on said surface; and
   (c) a plate member formed of substantially nondeformable material mounted over said sheet on said surface to protect the sheet against deformation into said opening and including means for orienting the member in a pre-determined relation to said surface;
   (d) said plate member having:
      (1) an aperture formed therein which is aligned with said indicia when the plate member is oriented in said predetermined relation on said surface, to thereby render said indicia visible through the plate member, and
      (2) an edge periphery which conforms substantially to the configuration of said groove and which is disposed in said groove when the plate member is mounted on said surface in said predetermined relation.

6. A cover plate assembly in accordance with claim 5 and wherein the indicia on said member is coated with a transparent protective material.

7. A cover plate assembly for a camera having a forward wall, at least one locating element on said wall, a lens mount projecting forwardly from said wall and carrying a photographing lens, a changeable diaphragm for said lens and a lever mounted on said wall and operatively associated with said lens diaphragm for manually changing the diaphragm opening, said cover plate assembly comprising:
(a) an indicia bearing sheet mounted on said wall and having:
(1) at least one portion for engagement with said locating element to properly orient said sheet on said wall, and
(2) openings formed therein which are aligned with said lens mount and lever, respectively, when the sheet is so oriented on said wall;
(b) a plate member formed of substantially nondeformable material mounted over said sheet on said surface to protect the sheet against deformation into said opening and including means for orienting the member in a predetermined relation on said surface;
(c) said plate member having:
(1) an aperture formed therein which is aligned with said indicia when the plate member is oriented in said predetermined relation on said surface, to thereby render said indicia visible through the plate member, and
(2) openings formed therein which are aligned with said lens mount and lever, respectively, for receiving the same when the plate is oriented in said predetermined relation on said wall, whereby said lever can be manually operated through said plate member; and
(d) means for securing said plate to said sheet with said aperture aligned with said indicia.

References Cited by the Examiner

UNITED STATES PATENTS

| 1,544,463 | 6/25 | Lengsflield | 206—45,31 |
| 1,613,365 | 1/27 | Underwood | 95—11 |
| 2,644,259 | 7/53 | Beadle. | |

FOREIGN PATENTS 208,233 8/55 Australia.

NORTON ANSHER, *Primary Examiner.*

JOHN M. HORAN, *Examiner.*